3,264,183
PROCESS FOR EFFECTING DIURESIS
Carl Ziegler, Glenside, Pa., assignor to Merck & Co., Inc., Rahway, N.J., a corporation of New Jersey
No Drawing. Continuation of application Ser. No. 804,116, Apr. 6, 1959. This application Oct. 26, 1964, Ser. No. 406,572
1 Claim. (Cl. 167—51.5)

This application is a continuation of my copending U.S. patent application, Serial No. 804,116, filed April 6, 1959, now abandoned.

This invention relates to novel 5-substituted toluene-2,4-disulfonamides and alkali metal salts thereof, which have the structural formula:

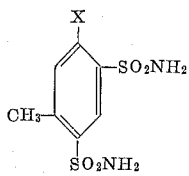

where X represents chlorine, bromine, fluorine and trifluoromethyl.

The new compounds in accordance with this invention are useful chemo-therapeutic agents particularly because of their diuretic properties. The compounds can be administered in therapeutic dosages in conventional vehicles as in the form of a tablet, since they are effective when administered orally as well as when injected. Since the alkali metal salts of the compounds of this invention are also readily soluble in an isotonic aqueous medium, injectable solutions can be prepared by dissolving each compound in the selected medium. The alkali metal salts are stable of themselves, although preservatives may be added if desired.

The dosage of the 5-substituted toluene-2,4-disulfonamide may be varied over a wide range and for this reason, scored tablets containing 100, 150, 250 and 500 milligrams of the active ingredient may be made available to the physician for the symptomatic adjustment of the dosage to the individual patient. These dosages are well below the toxic or lethal dose of the compound.

5-substituted toluene-2,4-disulfonamide in accordance with this invention is readily prepared by reacting m-substituted toluene with chlorosulfonic acid, and adding the resulting sulfonyl chloride to ammonia, producing the disulfonamide. This method of preparation is equally applicable to the chlorine, bromine, fluorine and trifluoromethyl-substituted compounds.

The alkali metal salts of the compounds of this invention are prepared with convenience by dissolving the compound in an aqueous or alcoholic solution of the selected alkali metal hydroxide and, if desired, isolating the salt by evaporating the solvent. Any of the conventional alkali metal salts, such as sodium, potassium, lithium or the like salts, can be prepared by this method or by any other methods conventionally used and well known to skilled organic chemists.

The preparation of the compounds is more fully described in the following examples. It is to be understood, however, that the examples are illustrative of the methods employed for their preparation and are not to be construed as limiting the invention to the particular reaction conditions specifically described.

*Example 1.—5-chlorotoluene-2,4-disulfonamide* m-Chlorotoluene (31.8 gms.) was added to 100 mls. of chlorosulfonic acid dropwise over a period of 15 minutes. The reaction mixture then was heated at 135° C. for 2 hours, cooled and poured onto ice. The solid was removed by filtration and air dried. The yield of disulfonyl chloride (M.P. 120–123° C.) was 44.6 gms. Treatment with liquid ammonia converted the disulfonyl chloride to the desired disulfonamide. Upon analysis, the resulting compound corresponded closely to the empirical formula $C_7H_9ClN_2O_4S_2$, confirming the fact that the compound was 5-chlorotoluene-2,4-disulfonamide.

*Example 2.—5-bromotoluene-2,4-disulfonamide* m-Bromotoluene (42.8 gms.) was added to 100 mls. of chlorosulfonic acid dropwise over a period of 15 minutes. The reaction mixture then was heated at 145° C. for 3 hours, cooled and poured onto ice. The solid was removed by filtration and air dried. Treatment with liquid ammonia converted the disulfonyl chloride to the desired 5-bromotoluene-2,4-disulfonamide.

*Example 3.—5-fluorotoluene-2,4-disulfonamide* m-Fluorotoluene (27.5 gms.) was added to 100 mls. of chlorosulfonic acid dropwise over a period of 15 minutes. The reaction mixture then was heated at 135° C. for 2 hours, cooled and poured onto ice. The solid was removed by filtration and air dried. Treatment with liquid ammonia converted the disulfonyl chloride to the desired 5-fluorotoluene-2,4-disulfonamide.

*Example 4.—5-trifluoromethyltoluene-2,4-disulfonamide* m-Trifluoromethyltoluene (40 gms.) was added to 100 mls. of chlorosulfonic acid dropwise over a period of 15 minutes. The reaction mixture then was heated at 135° C. for 2 hours, cooled and poured onto ice. The solid was removed by filtration and air dried. Treatment with liquid ammonia converted the disulfonyl chloride to the desired 5-trifluoromethyltoluene-2,4-disulfonamide.

*Example 5*

The product of Example 1 is reacted with an equivalent amount of NaOH, producing the sodium salt of 5-chlorotoluene-2,4-disulfonamide.

Activity tests in dogs of this compound revealed the compound to be active at $\frac{1}{20}$ of the full dose, intravenously, the full dose being conventionally and arbitrarily set at an initial priming dose of 25 milligrams per kilogram of body weight followed by an infusion of 30 mg./kg./hr. The free compound also is active when administered orally, only $\frac{1}{10}$ of the full dose being required, the full oral dose being 30 mg./kg.

Toxicity tests on mice showed the active dose to be far below the lethal dose. The $LD_{50}$ is greater than 600 mg. per kg. of body weight, and represents the least dosage that should kill one-half of the animals receiving the dose.

Similar alkali metal salts may be made of the bromine, fluorine-, and trifluoromethyl-substituted compounds using the procedure of Example 5.

*Example 6*

Compressed tablet containing 250 milligrams of active ingredient per tablet, in a quantity suitable for fifty tablets:

|  | Grams |
|---|---|
| 5-chlorotoluene-2,4-disulfonamide | 12.500 |
| Calcium phosphate tribasic | 2.095 |
| Methylcellulose 15 cps., 2%, 3 cc. | 0.060 |
| Starch paste 10%, 1 part; gelatine solution 20%, 1 part, 3 cc. | 0.450 |
|  | 15.105 |
| Methylcellulose 15 cps. | 0.750 |
| Talc, dried | 0.750 |
|  | 16.605 |

5-chlorotoluene-2,4-disulfonamide and calcium phosphate tribasic are mixed together and then passed twice through No. 60 bolting cloth. The methylcellulose solution is then added and thoroughly mixed in the granulation and the mixture then passed through a No. 10 screen. The starch-gelatine solution is then added to the granulation, thoroughly mixed, and passed through a No. 10 screen after which the total granulation is oven dried at between about 120 to 130° F. for 16 to 18 hours, and passed through a No. 18 screen. The methylcellulose is passed through a No. 60 bolting cloth onto this granulation and blended thoroughly therewith after which the talc is passed through a No. 60 bolting cloth and also thoroughly mixed with the granulation. The resulting granulation is compressed into tablets having a $1\tfrac{3}{32}''$ standard curvature punch yielding 50 tablets having a thickness of 0.155 to 0.160 inch, ten of which weigh 3.321 grams. The tablets have a hardness of 5 to 6 kilograms measured by the Monsanto Chemical Company tablet hardness tester apparatus, and a disintegration time of 12 minutes when tested by the U.S.P. tablet disintegrating apparatus (U.S. Pharmacopoeia 15th edition p. 937).

Compressed tablets may similarly be made containing appropriate dosages of the bromine-, fluorine- and trifluoromethyl-substituted compounds using the technique described in Example 6.

*Example 7*

The following is a suitable mixture, showing appropriate quantities per tablet:

| | Mgm. |
|---|---|
| 5-chlorotoluene-2,4-disulfonamide | 250 |
| Calcium phosphate tribasic | 40 |
| Starch (as 12.5% starch paste) | 12.5 |

To the foregoing, the following mixture is added:

| | |
|---|---|
| Corn starch | 15 |
| Magnesium stearate | 2.5 |
| Total weight | 320.0 |

The above ingredients are mixed, bolted and compressed into tablets in substantially the same manner described in Example 6.

While the above examples have described the preparation of certain specific compounds and a certain specific dosage form suitable for administering the novel compound of this invention in human therapy, it is to be understood that the invention is not to be limited by these examples or by the specific reaction conditions described for the preparation of the compounds or by the specific ingredients included in the pharmaceutical preparation. On the contrary, it is understood that this invention embraces variations and modifications, including the use of equivalent methods of preparation. However, it is also to be understood that this invention is specifically limited to the compounds defined in the claims and does not extend to the substitution of any other groups for those which are specifically defined in the claims.

What is claimed is:

The process of effecting diuresis which comprises administering to a host amenable to diuretic therapy a diuretic amount of the compound represented by the formula

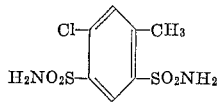

References Cited by the Examiner

UNITED STATES PATENTS

| 2,355,114 | 8/1944 | Schirm | 260—556 |
| 2,401,155 | 5/1946 | Hentrich et al. | 260—556 |
| 2,809,197 | 10/1957 | Novello | 260—243 |
| 2,835,702 | 5/1958 | Schultz | 167—51.5 X |
| 2,894,948 | 7/1959 | De Stevens | 260—243 |
| 2,957,883 | 10/1960 | Novello | 260—556 |

FOREIGN PATENTS

| 634,687 | 9/1936 | Germany. |

OTHER REFERENCES

Beilstein, Handbuch der Org. Chem., vol. 11, 2nd Supp., pp. 114–116 (1950).

David et al., J. Pharmacy and Pharmacology, vol. 12, 1960, pages 65–73.

Kulka, Canadian Journal of Chem., vol. 32, pp. 598–605 (1954).

FRANK CACCIAPAGLIA, JR., *Primary Examiner.*